(12) United States Patent
Dasti et al.

(10) Patent No.: US 7,457,614 B2
(45) Date of Patent: Nov. 25, 2008

(54) METHOD AND SYSTEM FOR PROVIDING ASSISTANCE TO VEHICLES WITH DAMAGED WHEEL COMPONENTS

(75) Inventors: Giovanni Dasti, Monte Cremasco (IT); Umberto Schiavi, Fiorenzuola D'Arda (IT)

(73) Assignee: Pirelli Pneumatici S.p.A., Milan (IT)

(*) Notice: Subject to any disclaimer, the term of this patent is extended or adjusted under 35 U.S.C. 154(b) by 900 days.

(21) Appl. No.: 10/494,465

(22) PCT Filed: Oct. 31, 2001

(86) PCT No.: PCT/IT01/00553

§ 371 (c)(1),
(2), (4) Date: Dec. 2, 2004

(87) PCT Pub. No.: WO03/038696

PCT Pub. Date: May 8, 2003

(65) Prior Publication Data

US 2005/0075767 A1    Apr. 7, 2005

(51) Int. Cl.
*H04M 3/42* (2006.01)
*H04Q 7/38* (2006.01)
(52) U.S. Cl. .............. 455/414.1; 455/404.1; 455/414.2; 455/414.3; 455/422.1; 455/423
(58) Field of Classification Search .................. 701/29, 701/30; 455/404.1, 414.1, 414.2, 414.3, 455/422.1, 423, 424
See application file for complete search history.

(56) References Cited

U.S. PATENT DOCUMENTS

| | | | |
|---|---|---|---|
| 5,890,061 A * | 3/1999 | Timm et al. ............... | 455/404.2 |
| 5,960,337 A * | 9/1999 | Brewster et al. .......... | 455/404.2 |
| 6,405,033 B1 * | 6/2002 | Kennedy et al. .......... | 455/414.1 |
| 2002/0082954 A1 * | 6/2002 | Dunston ...................... | 705/28 |
| 2004/0192348 A1 * | 9/2004 | Gudmundsson et al. .. | 455/456.1 |

* cited by examiner

*Primary Examiner*—John Q. Nguyen
*Assistant Examiner*—Ce Li
(74) *Attorney, Agent, or Firm*—Finnegan, Henderson, Farabow, Garrett & Dunner, L.L.P.

(57) ABSTRACT

A method for providing assistance to a distressed vehicle having a damaged wheel component includes establishing geographically diverse assistance point facilities and wheel component warehouse facilities, receiving an assistance request regarding the vehicle, identifying an assistance point facility in the vehicle's vicinity, transmitting information and authorization to the assistance point facility, directing the repaired vehicle to visit a dealer, providing dealer authorization to replace the loaner wheel component with a new wheel component, and directing shipment of the loaner wheel component to an assistance point facility. Each facility maintains an inventory of loaner wheel components. Assistance requests include information on vehicle location, vehicle damage, and wheel component requirements. Transmitted information reveals the vehicle location and enables identification of the loaner wheel component corresponding to the vehicle's wheel component requirements. Transmitted authorizations authorize service calls to repair the vehicle by replacing the damaged wheel component with the loaner wheel component.

15 Claims, 3 Drawing Sheets

| FIELD NAME | FIELD TYPE |
|---|---|
| CO | text |
| VT | text |
| VM | text |
| ID | text |
| US | text |
| OT | text |
| NW | number |
| PM | text |
| PTB | text |
| RM | text |
| RH | number |

3

| FIELD NAME | FIELD TYPE |
|---|---|
| TRM | text |
| NTRM | text |
| EQ | text |

4

| FIELD NAME | FIELD TYPE |
|---|---|
| APN | text |
| APA | text |
| WAT | yes/no |

METHOD AND SYSTEM FOR PROVIDING ASSISTANCE TO VEHICLES WITH DAMAGED WHEEL COMPONENTS

CROSS-REFERENCE TO RELATED APPLICATIONS

This application is a national-phase entry under 35 U.S.C. § 371 from International Application No. PCT/IT01/00553 filed Oct. 31, 2001, in the Italian Patent Office, the content of which is relied upon and incorporated herein by reference.

BACKGROUND OF THE INVENTION

1. Field of the Invention

Present invention consists of a method and system for providing assistance to a distressed vehicle, preferably a truck, having a damaged wheel component during a travel condition. In particular, the present invention regards a cheaper and faster method to substitute a damaged wheel component, for example a damaged wheel with an inflated tire, to a vehicle during a travel, for example during a travel in a highway or in a position far to every dealer. Said vehicle may be a car, truck, motorcycle, bus, trailer and wheeled equipment.

2. Description of the Related Art

In some cases the vehicles are not provided with a further wheel, for example some trucks are not provided with a further wheel. In these cases the users of said vehicles are not able to complete the travel without an assistance aid.

It is known that many tire company provides assistance service systems for their tire users. Michelin provides an assistance service named "Euroassist" to users which subscribe an agreement.

In particular, said company provides a system comprising a plurality of assistance point and an assistance center. The assistance center receives the calls from a vehicle with the damaged tire and it provides to send one aid units from one of said plurality assistance point to said vehicle. Said aid unit provides to substitute the damaged tire with another new tire. Said new tire is sold at a fixed prize in accordance with the above agreement. Each of the assistance points must have a minimum stock of predetermined tire models.

SUMMARY OF THE INVENTION

Applicant has observed that vehicles traveling on roads with a lot of different tire are provided. There are many models of tire vehicles, especially of tire trucks, and there are many different trucks traveling on roads. In particular, trucks traveling on road may have many different tires mounted on own rims. The substitution of a tire with another one of different model is sometimes not possible. To provide a rapid and efficient service an assistance point must have a large warehouse in which many different models of tires are provided. In a case of an operation of a tire substitution, in which the vehicle carry a tire model that it is not into the stock of the warehouse, the assistance point must need of a new model of tire from a dealer. Such dealer may be located in a far position with respect of the position of the vehicle itself or the position of the assistance point.

Applicant has addressed the problem of assisting a vehicle with a damaged wheel component, during travel in large geographical areas, in a short time and with a cheaper service. Moreover, The applicant has addressed the problem to manage tire and rim warehouses with a dynamical update system.

Applicant has found that it is possible to take part of a vehicle with a damaged wheel component, for example a inflated tire, by substituting said wheel with a damaged wheel component with a temporary wheel; said temporary wheel is not sold to the vehicle owner but it is substantially loaned or rented to the vehicle owner or user. The loaned period during until the vehicle owner returns said temporary wheel to a reference dealer, which is able to substitute said temporary wheel with a new permanent wheel. Said new permanent wheel may be said wheel with the damaged component after a reparation operation or a new wheel if said damaged component was not possible to repair.

In a first aspect present invention regards a method to Applicant has provided a method for providing assistance to a distressed vehicle having a damaged wheel component, the method comprising:

authorizing establishment of a plurality of geographically diverse assistance point facilities, each facility for maintaining an inventory of loaner wheel components for a plurality of vehicles having differing wheel component requirements;

authorizing establishment of a plurality of geographically diverse wheel component warehouse facilities;

receiving an assistance request regarding the distressed vehicle, the assistance request including information on a location of the distressed vehicle, a nature of damage to the distressed vehicle's wheel component, and information reflective of wheel component requirements of the distressed vehicle;

identifying an appropriate assistance point facility in a vicinity of the location of the distressed vehicle, and transmitting to said appropriate facility information revealing the location of the distressed vehicle, information sufficient to enable identification of a loaner wheel component within the wheel component requirements of the distressed vehicle, and authorization to making a call, to the distressed vehicle and to repair the distressed vehicle by replacing the damaged wheel component with the loaner wheel component;

directing the repaired distressed vehicle, fitted with the loaner wheel component, to visit one of a plurality of dealers facilities;

providing authorization to said dealer facility to replace the loaner wheel component with a new wheel component; and directing shipment of the loaner wheel component to one of the authorized assistance point facilities.

Preferably said distressed vehicle is one of a car, truck, motorcycle, bus, trailer and wheeled equipment.

Preferably, the method of further comprising the step of tracking the wheel component warehouses of the plurality of geographically diverse assistance point facilities.

Preferably, a directing shipment of loaner wheel components from dealers to assistance point facilities is performed as a function of said tracked wheel component warehouses.

Preferably, a directing shipment of loaner wheel components from assistance point facilities is performed as a function of geographical proximity of assistance point facilities to the vehicle with the damaged wheel component.

A further aspect of present invention regards a method for providing assistance to a distressed vehicle having a damaged wheel component, the method comprising:

maintaining a warehouse of loaner wheel components for a plurality of vehicles having differing wheel component requirements;

receiving an assistance request regarding the distressed vehicle, the assistance request including information on a location of the distressed vehicle, a nature of damage to the distressed vehicle's wheel component, and information reflective of wheel component requirements of the distressed vehicle;

removing from said warehouse at least one loaner wheel component for loan to the distressed vehicle;

dispatching an assistance unit, carrying the at least one loaner wheel component, to the location of the distressed vehicle, the assistance unit for removing the damaged wheel component and replacing it with the loaner component; and receiving into said warehouse a replacement for the loaner wheel component.

A further aspect of present invention regards a method for providing assistance to a distressed vehicle having a damaged wheel component, the method comprising:

receiving an assistance request regarding the distressed vehicle, the assistance request including information on a location of the distressed vehicle, a nature of damage to the distressed vehicle's wheel component, and information reflective of wheel component requirements of the distressed vehicle; and identifying an appropriate assistance point location in a vicinity of the location of the distressed vehicle, and transmitting to said appropriate assistance point information revealing the location of the distressed vehicle, information sufficient to enable identification of a loaner wheel component within the wheel component requirements of the distressed vehicle, and instructions for making a service call to the distressed vehicle and for replacing the damaged wheel component with the loaner wheel component.

A further aspect of present invention regards a system for providing loaner wheel components to distressed vehicles, the system comprising:

a central company database containing locations of a plurality of assistance point facilities having warehouses of loaner wheel components;

an emergency call center for receiving calls about distressed vehicles having damaged wheel components;

a first data structure for storing information about emergency calls, said first data structure for storing information relatives of distressed vehicle location, distressed vehicle type, and information reflecting a nature of wheel component damaged;

a processor for comparing first data structure information about distressed vehicle location with a geographic table of said central company database, in which locations of assistance point facilities are provided, and for identifying appropriate assistance point proximate to the distressed vehicle;

a transmitter for sending to said appropriate assistance point dispatch authorizations to make service calls to distressed vehicles with damaged wheel components and to replace the damaged wheel components with loaner wheel components;

replacement approval means for providing wheel component reference dealer with authority to remove loaner wheel components and to replace the loaner wheel components with new wheel components; and dispatch means for directing removed loaner wheel components from said reference dealer to said assistance point.

BRIEF DESCRIPTION OF THE DRAWINGS

Further features and advantages of the present invention will appear more clearly from the following detailed description of a preferred embodiment, made with reference to the attached drawings. In such drawings:

in FIG. 2 a possible structure of databases associated to the system is shown according with the invention;

DETAILED DESCRIPTION OF THE EXEMPLARY EMBODIMENTS

Figure 1:
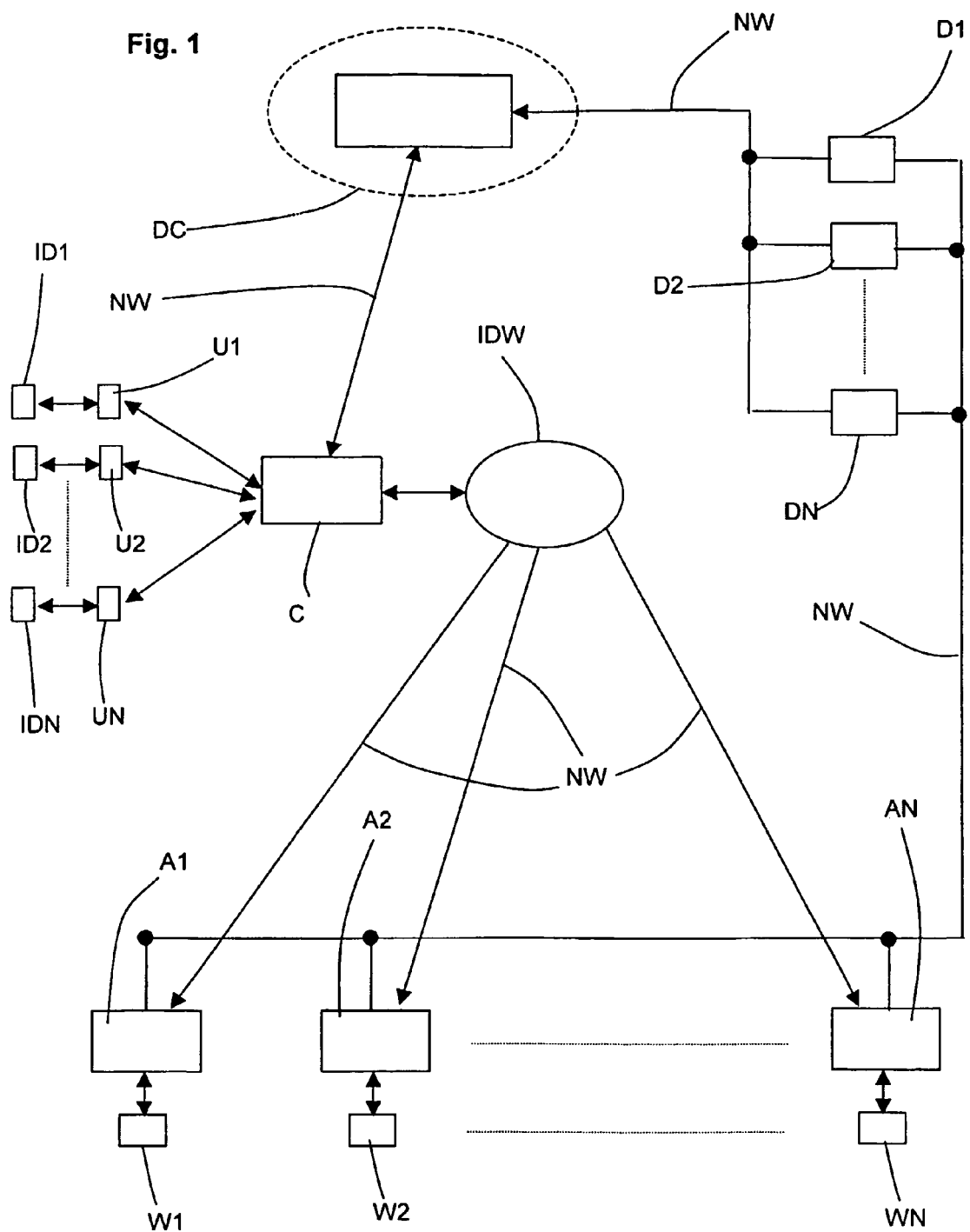
in FIG. 1 a scheme of the system to provide assistance to a vehicle is shown according with the invention.

A system to provide assistance to a distressed vehicle on the road shown in FIG. 1 comprises a plurality of dealer D1, D2, . . . , DN in which tires of a company are sell.

Assistance on road services of the system according to present invention are directed to users U1, U2, . . . , UN, which have made an agreement with the company preferably by means of one of said dealers.

For example, a user which wants buy pneumatic tires for his vehicle from one of said dealers may draw up an agreement for receiving the services of said system. Moreover, said services may be extended to users which carry on their vehicle pneumatic tires different from the pneumatic tires of said company, by means of a different agreement.

The services are designed for private user vehicles, and to vehicle fleets, especially truck fleets. In particular, a owner of a vehicle fleet needs of a convenient service, a cheaper service, but principally of a rapid ed efficient assistance service. In fact, the costs of a stopped vehicle caused by a damaged tire are sometimes relevant costs. The private user needs of a secure service which assures him to release an efficient vehicle after the assistance work.

The information about said users and vehicles which want receive the services are registered in a central company database DC located for example in a company server.

The system further comprises at least a emergency call center C, connected with said company server and with said central company database DC, a plurality of assistance point facilities A1, A2 . . . AN. Preferably, each of said assistance points having an own warehouse of wheel components W1, W2, WN for a plurality of vehicles having differing wheel component requirements.

Said emergency call center C is able to receive and collect assistance requests from said users U1, U2, . . . , UN.

Said emergency call center, said dealers, said assistance point facilities and said central company database are connected each other, for example by means of server computers, and they are able to share and update information. The connection may be preferably a telecommunication network, like Internet network or like an Intranet private network. Alternatively, said connection by a telephone line may be carry out. In FIG. 1, said kind of connections by means of lines or arrows NW are shown.

The system provides a plurality of assistance points as above described. Each of said assistance points have a own wheel components warehouse (for example a tires and rims warehouse). Preferably, in said wheel components warehouse, a predetermined number of tire and rim models are provided. Each assistance point may be connected with said central company database by means of a predetermined software, which is able to extract the information from said central database about how many tire and rim models of registered vehicles are present. To this purpose said central database DC comprises preferably a warehouse table in which information about tire and rim models contained in each warehouse are stored.

Moreover, said assistance point is able to access to said warehouse table of the central company database, and an operator of said assistance point is able to update the information of said warehouse table in correspondence to some changes into the users and vehicles table of the database.

In this way the management of the central company database DC is a dynamical management. The number of tire and rim models may change in correspondence with an update of said central company database, or in correspondence to a fixed date, for example said updating may occurs monthly or weekly.

Advantageously, said emergency call center C comprises a identification software IDW act to connect the call center with a geographic table of said central company database. Said geographic table contains the locations of said plurality of assistance point facilities.

Preferably, said identification software compares the information received from said assistance request of the user and the information contained in the geographic table and the information contained in the users and vehicles table of said central company database and it is able to determine what is the more suitable assistance point to the vehicle with the damaged wheel and what is the reference dealer of said user. Preferably, the reference dealer is the dealer which has sold the tire and/or the rim to the user and which has proposed the agreement for the service to the user.

In FIG. 2 a possible structure of said central database comprises said users and vehicles table 2, said geographic table 3 and said warehouse table 4 is shown.

Said central company database into said users and vehicles table comprises information about all registered vehicles and users, which carry tires of said company. The information are collected preferably by said dealers, for example by means of a Internet Website in which is possible entering said information and/or parameters by means of a specific entry form on a Web Page of said Website. Said entry form preferably comprises one or more groups of mutually homogeneous fields in which a dealer manager is able to enter the information and/or parameters. The entry form may be sent, for example by clicking one or more mouse clicks inside the Web Page provided, by Internet to the server of said company in which said central company database is located and in which the information are preferably processed.

Preferably, said users and vehicles table 2 comprises a plurality of fields. Said fields contain information about the vehicle. Said field for example may be:
 Company (CO);
 Vehicle type (VT);
 Vehicle model (VM);
 Vehicle ID (VID);
 Users (US);
 Other info (OT).

Preferably, the field "company" is used if the vehicle is comprised in a vehicle fleet, and it represent the name of the company owner of said vehicle the address and other information about the company itself. The field "vehicle type" describes which kind of vehicle is; for example truck, car, motorbike, etc . . . .

The field "vehicle model" contains name of the vehicle, for example Mercedes A3, BMW 518 etc . . . . The field "vehicle id" contains specific information of vehicle, for example the license plate number.

The field "user" contains for example identification information about all the users of said vehicle. The field "other info" may be used for load other information of the vehicle, for example time of the last assistance work on road, time of other programmed assistance work, etc. . . .

Moreover the users and vehicles table 2 of the database provides a plurality of field regarding the wheels of the vehicle. For example:
 number of the wheel (NW);
 pneumatic measure (PM);
 pneumatic tread band (PTB);
 rim measure (RM);
 rim holes (RH).

Preferably, to said vehicle an identification card may be associated (ID1, ID2, IDN in FIG. 1). In said card, the information of the vehicle contained in said central company database may be loaded. Preferably, the information about the vehicle may be inserted in said card by one of said dealers. For example, said card may be a magnetic strip card or an electronic memory card. Advantageously, an adequate reader card device, which is preferably connected with a computer, is able to store and update the information of the vehicle into said card.

Preferably said geographic table 3 comprises a plurality of field. The fields may be the following:
 assistance point name APN;
 assistance point address; APA
 warehouse type WAT (boolean field).

The field "assistance point name" may comprise, for example, the exactly name of the company or a conventional nickname. The field "assistance point address" may comprise for example the real address of the vehicle or a position identified with coordinates with respect a predetermined referred system.

The field "warehouse type" indicates if the assistance point has an own wheel component warehouse or for example if it is connected to a common warehouse wheel component of another assistance point.

Preferably, said warehouse table 4 comprises information about the rim and tire models TRM, and the number of each tire or rim model NTRM. Said table may advantageously comprise further information about equivalent tires and rims EQ with respect to the tire and rim models contained in said wheel component warehouse.

Said assistance request may be received in many different ways. For example, the assistance request may be in a form of a phone call to one of a predetermined phone numbers of the call center, in a form of an E-mail if said vehicle by a computer on-line is provided, or in a form of a Internet communication by compiling an appropriate assistance request form on the above cited website.

The user communicates to said emergency call center information about the assistance request. Preferably the user communicates the id of the card IDC, which preferably correspond to the VID field in the users and vehicles table 2 of said central company database, the position of the vehicle PO and information about the damaged wheel component. Said information of damaged wheel component may be the tire type, and the position of the wheel on the vehicle (a truck for example have typically front steering axle, a first rear driving axle, a second rear idle axle and a trailer) and the kind of damage; advantageously, the information needed to the system of said damaged tire are the same information which are present into the central company database. Said information of the distressed vehicle in a first data structure are stored.

Said emergency call center further comprises a processor for comparing first data structure information about distressed vehicle location with said geographic table in which information about locations of assistance point facilities are provided. Said processor compares said information to identifying an appropriate assistance point.

Following two rules preferably does the choice of the better appropriate suitable assistance point facilities. A first rule is about which are the assistance points having a set of compatible tires and rims for said vehicle. A second rule is about the distance between all the above assistance points and the vehicle with the damaged wheel component. The chosen assistance point is able to send an assistant unit to said vehicle.

To this scope, said call center provides a transmitter for sending to said appropriate assistance point dispatch authorizations to make service calls to distressed vehicles with damaged wheel components and to replace the damaged wheel components with loaner wheel components;

Advantageously, said assistance unit is provided with a set of compatible wheels, coming from the wheel component warehouse, for said vehicle. For example, for many vehicles is possible to substitute a tire model with another substantially equivalent tire model without generating any dangerous conditions for the user.

The assistance unit checks the type of assistance work which the vehicle needed. For example if the damaged wheel component is a tire only a tire needs to be substituted of if also a rim needs of a substitution. In any case, the damaged wheel is substituted with a temporary wheel comprise a temporary tire and a temporary rim. Said temporary wheel is one of said set of compatible wheels. Preferably, said temporary wheel is not a new wheel, but it may be a used compatible wheel for said vehicle. In particular, if the damaged wheel component has only the tire inflated the temporary wheel may comprise a used rim and a used tire. This temporary wheel has to be travel for a limited number of miles and for a limited period of time. In fact, the user with his vehicle at the end of the travel may substitute the temporary wheel with a new wheel with a new tire if the damaged component of the wheel was not possible to repair, or with the damaged wheel with the repaired component re-mounted on.

The assistance unit communicates to the user a list of dealers in which the temporary wheel can be returned and in which the identification card may be updated with the information of the last assistance work. The user may choose one reference dealer of said dealers of the list and communicates his choice in a way to permits to the assistance unit to send the damaged wheel to said reference dealer.

The assistance unit directs the repaired distressed vehicle, fitted with the loaner wheel component into said temporary wheel, to visit said reference dealer.

Moreover, said reference dealer is in charge to restitute the substituted damaged wheel repaired to the user or to sell at a predetermined prize a new wheel. In general, said dealer replaces the loaner wheel component with a new wheel component and directs the loaner wheel component to one of the authorized assistance point facilities.

The assistance unit preferably takes in charge the damaged wheel and it decides if the damaged wheel is possible to being repaired or if the tire or rim of said damaged wheel has to be get over or sell out.

Preferably, the assistance point send the damaged wheel to the reference dealer if it is possible to repair the entire wheel, or it sends to the reference dealer only those components of the wheel who it can be repaired.

The company provides replacement approval means for providing wheel component reference dealer with authority to remove loaner wheel components and to replace the loaner wheel components with new wheel components, and dispatch means for directing removed loaner wheel components from said reference dealer to said assistance point.

Alternatively, the assistance point in any case may send the damaged wheel to said reference dealer. Said dealer may decide which part of the wheel has to be repaired and which part of the wheel has to be sell out.

Moreover, the assistance point may update its wheel components warehouse by another wheel of the same type of the temporary wheel used by the assistance unit. This operation by said reference dealer or by another dealer or directed by said warehouse company may be done.

Figure 3:
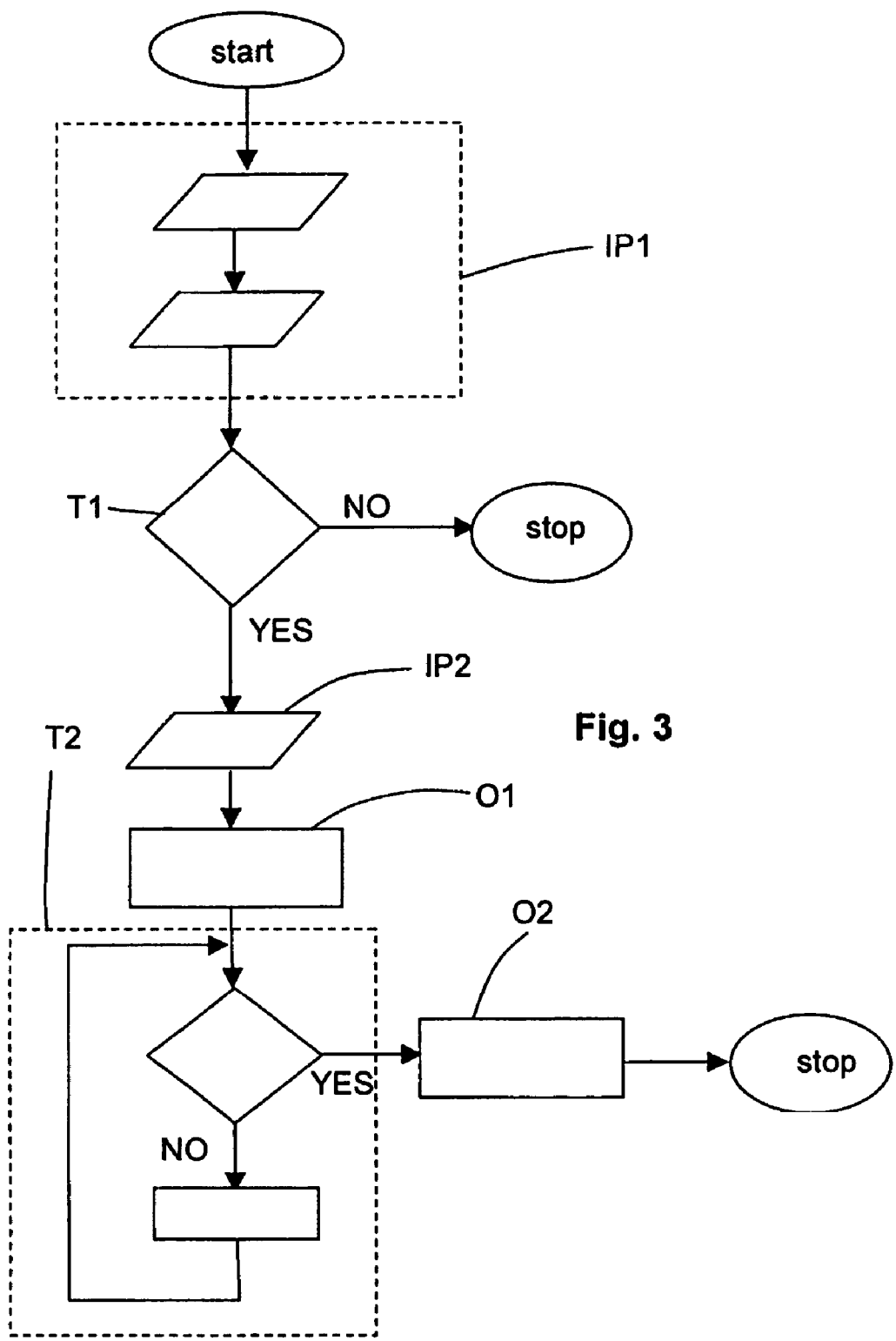
in FIG. 3 a flow chart of the functioning of a identification software of the system is shown according to present invention.

An example of the function of said identification software of the emergency call center according to present invention, in the flow chart of FIG. 3a is shown.

A first input procedure IP1 of said software comprises the step of receiving an assistance request regarding the distressed vehicle, the assistance request including information on a location of the distressed vehicle, a nature of damage to the distressed vehicle's wheel component, and information reflective of wheel component requirements of the distressed vehicle;

For example, said information may be inputted into a input form compiled by an operator of the call center. Moreover said procedure IP1 extracts information from said central company database.

A first test T1 compares the information received from said user, in particular the identification card IDC of the vehicle, with the field vehicle identification VID present on the vehicle table of said central company database, to determine if the vehicle is registered.

If the vehicle is registered into the database, the call center has sufficient information to assist said vehicle. If the vehicle is not registered, for example if the identification card is expired, the call center may require further information from the user to provide the assistance.

A second input procedure IP2 comprises the step of receiving information, from said geographic table.

A first output procedure O1 sort a list of the assistance points, preferably starting to the closest to the vehicle, and choose the first assistance point on said list.

A second test T2 determine if the chosen assistance point, present on the list of the first output procedure O1, is able to provide assistance to the vehicle. For example, if the warehouse of the assistance point has a tire model equivalent to the fault tire of the vehicle.

If the chosen assistance point is not able to provide assistance the software choose the next assistance point on said list and repeat the test.

If the chosen assistance point is able to provide assistance to the vehicle the software generates for example an output work document. Said document is sent to the chosen assistance point for example in a form of an E-mail or by a fax, etc. . . .

Said work document may contain, for example, information about the vehicle with the fault wheel like the vehicle type, wheel type fault type, username, the position of the vehicle, time of the call to the call center etc. . . .

Practically, said step are act to identifying an appropriate assistance point facility in a vicinity of the location of the distressed vehicle, and transmitting to the appropriate assistance point facility information revealing the location of the distressed vehicle, information sufficient to enable identification of a loaner wheel component within the wheel component requirements of the distressed vehicle, and authorization to making a call, from an assistance unit, to the distressed vehicle and to repair the distressed vehicle by replacing the damaged wheel component with the loaner wheel component.

A user needs generally of a rapid service, especially if the user is a truck driver. A truck which travels with goods, needs to arrive to a destination in a fixed time. A long stop of the vehicle during travel may compromise a delivery of said goods. Moreover, the substitution of a damaged tire in a truck often don't need a substitution with an identical tire, but the damaged tire may be substituted for a short time with a used equivalent tire without compromise the vehicle security. The user, in this case the truck driver, with the service of present invention doesn't need to take part of a substitution of damaged tire. If said vehicle is part of a fleet advantageously the agreement signed by the fleet owner may comprise all the vehicles of the fleet. In this case the fleet owner may obtain the service at a fixed prize. Moreover, the service excludes the owner to organize an assistance service of its vehicles and it permits to minimize the period of vehicles stop.

The link between the company the dealers and the assistance point facilities permits to optimize the warehouses management. In particular, the connections between said databases and the frequent updating of the databases assure to the system a efficiently management of the warehouses. In this manner the wheel component warehouses contain a limited number of tires and rims, but each of the warehouse is able to provide tires and rims of substantially to all the users registered.

At the same time the dealers connected with the system don't need to organize assistance units. The connection with the assistance points and with the company provide to the dealers the possibility of being informed of the requests of all the users in a short time and before the user themselves communicate directly to the reference dealer said requests. The reference dealer may manage said requests with a larger time available.

A further possibility of said system is to provide a maintenance service for the registered vehicles by means of said identification card. For example, each of the registered vehicles may have a maintenance program which is registered on said card in connection with one of said dealers. If the user respects all the expire dates of the maintenance program, it may have for example the assistance service, in case of an inflated tire during travel, free of charge.

Naturally, if the user respects all the expiration dates of the maintenance program the possibility of a damaged wheel is minimized.

The invention claimed is:

1. A method for providing assistance to a distressed vehicle having a damaged wheel component, the method comprising:
   authorizing establishment of a plurality of geographically diverse assistance point facilities;
   authorizing establishment of a plurality of geographically diverse wheel component warehouse facilities;
   receiving an assistance request regarding the distressed vehicle;
   identifying an appropriate assistance point facility in a vicinity of a location of the distressed vehicle;
   transmitting information to the appropriate assistance point facility;
   transmitting authorization to the appropriate assistance point facility;
   directing the repaired distressed vehicle, fitted with a loaner wheel component, to visit one of a plurality of dealer facilities;
   providing authorization to the dealer facility to replace the loaner wheel component with a new wheel component; and
   directing shipment of the loaner wheel component to one of the assistance point facilities;
   wherein each assistance point facility maintains an inventory of loaner wheel components for a plurality of vehicles having differing wheel component requirements,
   wherein the assistance request comprises:
      information on the location of the distressed vehicle;
      information on a nature of damage to the distressed vehicle's wheel component; and
      information regarding wheel component requirements of the distressed vehicle;
   wherein the transmitted information:
      reveals the location of the distressed vehicle; and
      enables identification of the loaner wheel component corresponding to the wheel component requirements of the distressed vehicle;
   wherein the transmitted authorization:
      authorizes a service call to be made to the distressed vehicle; and
      authorizes repair of the distressed vehicle by replacing the damaged wheel component with the loaner wheel component.

2. The method of claim 1, wherein the distressed vehicle is one of a car, truck, motorcycle, bus, trailer, and wheeled equipment.

3. The method of claim 1, wherein directing shipment of the loaner wheel component from the appropriate assistance point facility is performed as a function of geographical proximity of the assistance point facilities to the vehicle with the damaged wheel component.

4. The method of claim 1, further comprising tracking the wheel component warehouse facilities.

5. The method of claim 4, wherein directing shipment of loaner wheel components from dealers to assistance point facilities is performed as a function of the tracked wheel component warehouse facilities.

6. The method of claim 4, wherein directing shipment of the loaner wheel component from the appropriate assistance point facility is performed as a function of geographical proximity of the assistance point facilities to the vehicle with the damaged wheel component.

7. A method for providing assistance to a distressed vehicle having a damaged wheel component, the method comprising:
   establishing a plurality of geographically diverse assistance point facilities;
   establishing a plurality of geographically diverse wheel component warehouse facilities;
   receiving an assistance request regarding the distressed vehicle;
   identifying an appropriate assistance point facility in a vicinity of a location of the distressed vehicle;
   transmitting information to the appropriate assistance point facility;
   transmitting authorization to the appropriate assistance point facility;
   directing the repaired distressed vehicle, fitted with a loaner wheel component, to visit one of a plurality of dealer facilities;
   providing authorization to the dealer facility to replace the loaner wheel component with a new wheel component; and
   directing shipment of the loaner wheel component to one of the assistance point facilities;

wherein each facility maintains an inventory of loaner wheel components for a plurality of vehicles having differing wheel component requirements, wherein the assistance request comprises:
 information on the location of the distressed vehicle;
 information on a nature of damage to the distressed vehicle's wheel component; and
 information regarding wheel component requirements of the distressed vehicle;

wherein the transmitted information:
 reveals the location of the distressed vehicle; and
 enables identification of the loaner wheel component corresponding to the wheel component requirements of the distressed vehicle; and wherein the transmitted authorization:
 authorizes a service call to be made to the distressed vehicle; and
 authorizes repair of the distressed vehicle by replacing the damaged wheel component with the loaner wheel component.

8. The method of claim 7, wherein the distressed vehicle is one of a car, truck, motorcycle, bus, trailer, and wheeled equipment.

9. The method of claim 7, wherein directing shipment of the loaner wheel component from the appropriate assistance point facility is performed as a function of geographical proximity of the assistance point facilities to the vehicle with the damaged wheel component.

10. The method of claim 7, further comprising tracking the wheel component warehouse facilities.

11. The method of claim 10, wherein directing shipment of loaner wheel components from dealers to assistance point facilities is performed as a function of the tracked wheel component warehouse facilities.

12. The method of claim 10, wherein directing shipment of the loaner wheel component from the appropriate assistance point facility is performed as a function of geographical proximity of the assistance point facilities to the vehicle with the damaged wheel component.

13. A method for providing assistance to a distressed vehicle having a damaged wheel component, the method comprising:
 maintaining a warehouse of loaner wheel components for a plurality of vehicles having differing wheel component requirements;
 receiving an assistance request regarding the distressed vehicle;
 removing from the warehouse at least one loaner wheel component for loan to the distressed vehicle;
 dispatching an assistance unit, carrying the at least one loaner wheel component, to a location of the distressed vehicle; and
 receiving into the warehouse a replacement for the at least one loaner wheel component;

wherein the assistance request comprises:
 information on the location of the distressed vehicle;
 information on a nature of damage to the distressed vehicle's wheel component; and
 information regarding wheel component requirements of the distressed vehicle; and wherein the assistance unit removes the damaged wheel component and replaces the damaged wheel component with the at least one loaner wheel component.

14. A method for providing assistance to a distressed vehicle having a damaged wheel component, the method comprising:
 receiving an assistance request regarding the distressed vehicle;
 identifying an appropriate assistance point facility in a vicinity of a location of the distressed vehicle;
 transmitting information to the appropriate assistance point facility; and
 transmitting instructions to the appropriate assistance point facility;

wherein the assistance request comprises:
 information on the location of the distressed vehicle;
 information on a nature of damage to the distressed vehicle's wheel component; and
 information regarding wheel component requirements of the distressed vehicle;

wherein the transmitted information:
 reveals the location of the distressed vehicle; and
 enables identification of a loaner wheel component corresponding to the wheel component requirements of the distressed vehicle; and wherein the transmitted instructions provide:
 instructions for making a service call to the distressed vehicle; and
 instructions for replacing the damaged wheel component with the loaner wheel component.

15. A system for providing loaner wheel components to a distressed vehicle, the system comprising:
 a central company database containing locations of a plurality of assistance point facilities having warehouses of loaner wheel components;
 an emergency call center for receiving emergency calls about distressed vehicles having damaged wheel components;
 a first data structure for storing information about the emergency calls;
 a processor for comparing first data structure information about distressed vehicle location with a geographic table of the central company database in which locations of the assistance point facilities are provided, and for identifying an appropriate assistance point facility proximate to the distressed vehicle;
 a transmitter for sending to the appropriate assistance point facility dispatch authorizations to make service calls to distressed vehicles with damaged wheel components and to replace the damaged wheel components with loaner wheel components;
 replacement approval means for providing wheel component reference dealers with authority to remove the loaner wheel components and to replace the loaner wheel components with new wheel components; and
 dispatch means for directing removed loaner wheel components from the reference dealers to the assistance point facilities;

wherein the first data structure stores information regarding distressed vehicle location, distressed vehicle type, and a nature of wheel component damage.

* * * * *